Aug. 28, 1934.                H. T. COVINGTON, JR                1,971,521
                                SIGNALING DEVICE
                              Filed Jan. 12, 1934
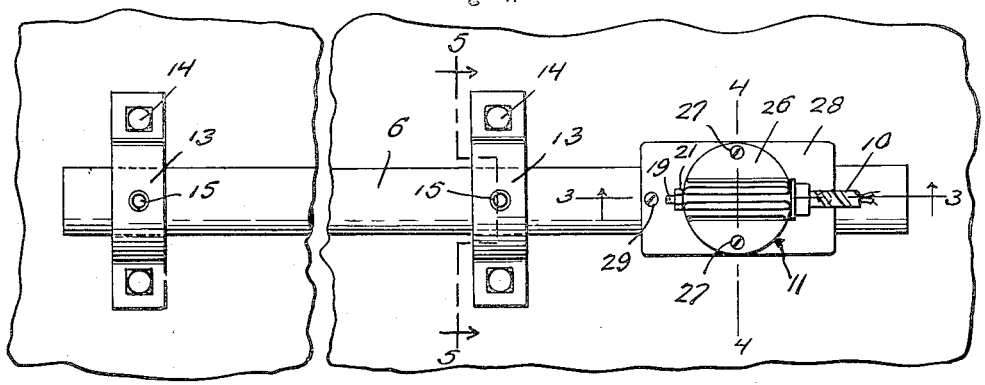
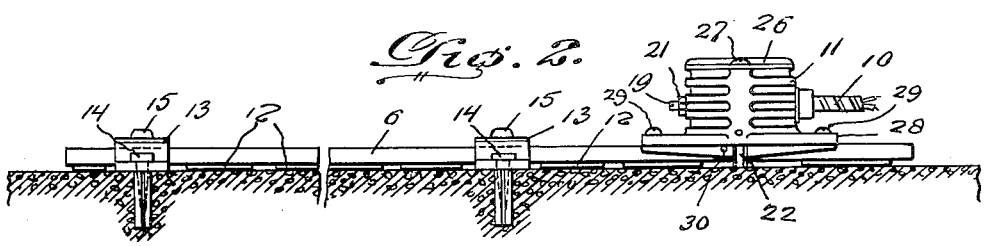
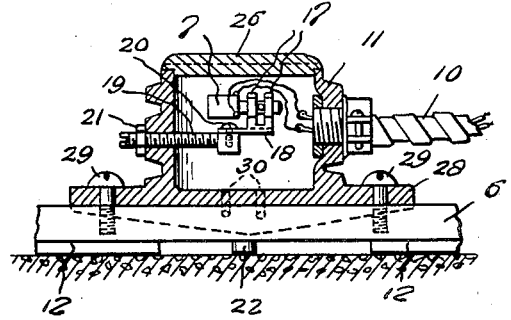
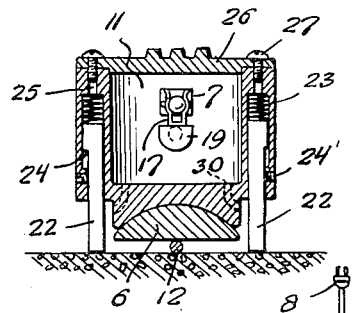
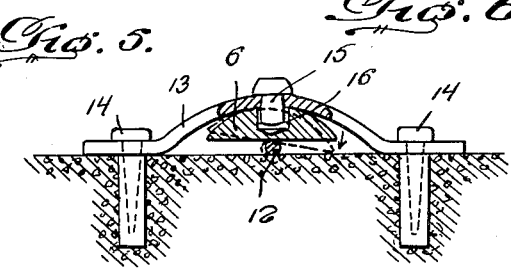
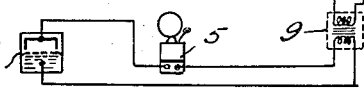
Harris T. Covington, Jr.
INVENTOR.
BY J. Stanley Busch
ATTORNEY.

Patented Aug. 28, 1934

1,971,521

UNITED STATES PATENT OFFICE 1,971,521

SIGNALING DEVICE

Harris T. Covington, Jr., Chicago, Ill.

Application January 12, 1934, Serial No. 706,428

6 Claims. (Cl. 200—86)

This invention relates to electrical signaling devices, and has more particular reference to a device for automatically announcing the arrival of a motor vehicle at a service station or the like, whereby the driver of the vehicle may be assured of prompt service.

The primary object of the present invention is to provide a motor vehicle actuated annunciating or signaling device which is extremely simple and durable in construction and efficient in operation.

A further object is to provide improved means including a rocking tread bar movable by the wheels of a motor vehicle passing thereover for rendering an annunciator operative.

Other objects and features of the invention will become apparent as the same is better understood, and the invention consists in the novel form, combination and arrangement of parts hereinafter more fully described, shown in the accompanying drawing and claimed.

In the drawing:

Figure 1 is a top plan view, partly broken away, of the means or device operable by the wheels of a motor vehicle for rendering the annunciator operative.

Figure 2 is an elevational view of the device shown in Figure 1.

Figure 3 is a fragmentary longitudinal section on line 3—3 of Figure 1.

Figure 4 is a transverse section on line 4—4 of Figure 1.

Figure 5 is a transverse section taken substantially on line 5—5 of Figure 1; and Figure 6 is a wiring diagram illustrating how the switch of the device shown in Figure 1 may be included in the circuit of an annunciator or suitable electric signal.

The present invention aims to provide means for automatically announcing the arrival of a motor vehicle at a service station when the vehicle enters a driveway of the latter, so that the attendant of the service station will be properly informed for assuring prompt service to the driver of the arriving vehicle. As shown in Figure 6, a suitable annunciator or alarm 5 may be suitably mounted within the office of the service station, and the present invention embodies means operable by the wheels of the vehicle entering a driveway of the service station for automatically rendering the annunciator or alarm 5 operative, such means including a rocking tread bar 6 movable by the wheels of the vehicle. As shown, the annunciator or alarm 5 may be in the nature of an electrical buzzer or bell included in a normally open circuit closed by a switch 7 upon lateral tilting of the tread bar 6 in either direction, said switch being carried by and movable with the rocking or laterally tiltable tread bar 6. Current for the actuation of annunciator or alarm 5 may be derived from a battery, although the same is shown as preferably derived from a house-wiring system by the use of an attachment plug 8, the house-current being suitably stepped down or reduced in voltage for operation of the annunciator or alarm 5 by means of a transformer 9. The wires from the transformer and the annunciator preferably pass from the office of the service station through a flexible conduit 10, the latter being connected at one end to an end of a housing 11 rigidly attached to the bar 6 and within which the switch 7 is mounted, the said wires passing from the conduit 10 into the housing 11 for suitable connection with the switch 7 as shown.

The rocking tread bar 6 is preferably of half oval cross section so as to present a transversely arched upper surface and a flat undersurface as clearly shown in Figures 4 and 5 to facilitate passage of the vehicle wheels thereover, a suitable rounded interrupted or continuous longitudinal rib 12 being provided on the underside of the bar 6 centrally between the sides of the latter for contact with the ground or driveway whereby the said bar rests upon said ground or driveway for lateral rocking or tilting movement. This rib may be composed of a separate rod or wire or separate rod or wire sections welded or otherwise secured to the bottom of the said bar 6, or said rib may be formed integral with said tread bar. In order to prevent lateral displacement of the tread bar bodily from operative position upon the ground or driveway, as well as upward displacement of the same from the ground, arched strap members 13 are extended over and across the tread bar 6 at spaced points and are anchored at their ends to the ground or driveway as at 14, the straps 13 being provided with central depending pins 15 loosely engaging in sockets or recesses 16 in the upper surface of the bar 6. In other words, the straps 13 hold the bar on the ground or driveway, while the pins 15 prevent bodily lateral displacement of the tread bar while permitting lateral rocking or tilting thereof due to their loose engagement in the sockets or recesses 16.

The switch 7 is preferably of the mercury tube type adapted to open the alarm or annunciator circuit when the tread bar 6 is in its normal untilted position as shown by full lines in Figures 4 and 5, and to close the circuit of said annunciator or alarm when the said bar 6 is tilted laterally in either direction by the passage of the wheels of a motor vehicle thereover. As shown, switch 7 is carried by spring clips 17 of a mounting bracket 18 attached at one end to the inner end of an adjusting screw 19 by means of a securing screw 20 whereby the bracket 18 and the switch 7 may be rotarily adjusted about a vertical axis defined by the screw 20. The adjusting screw 19 is threaded through one end of housing 11 so that turning thereof will adjust the switch 7 about an axis defined by the screw 19 in an arc transverse to the bar 6. This adjusts the switch 7 downwardly and laterally or upwardly and laterally with respect to said bar 6 so that the circuit of the alarm will be normally opened when the tread bar 6 is untilted, regardless of the way the ground or driveway lays as to inclination both laterally and longitudinally of the tread bar. A jamb nut 21 is provided on adjusting screw 19 to secure the latter in any desired position of the same.

Means is provided for yieldingly resisting tilting movement of the tread bar 6 and to return the same to normal untilted position as soon as the wheels of the vehicle pass thereover, and such means consists of spring-pressed pins 22 slidably mounted in opposite sides of the housing 11 and urged downwardly into engagement with the ground by means of helical springs 23 interposed between the upper ends of the pins 22 and the top walls of the recesses of housing 11 within which said pins 22 are slidably mounted. The pins 22 are preferably reduced at their outer sides to provide shoulders 24 near the upper ends of the same, and threaded through the sides of housing 11 are stop screws 24' which offer no obstruction to proper sliding movement of pins 22, but which limit downward sliding movement thereof by engagement with the shoulders 24 so as to prevent the pins 22 from passing entirely out of the recesses in which they are slidably mounted, such as when the switch device is off of the ground prior to installation. The housing 11 has openings 25 which extend downwardly to the recesses in which the pins 22 are mounted, to facilitate introduction of a lubricant whereby friction between the housing and the pins 22 and springs 23 may be minimized. Housing 11 preferably has a removable cover 26 secured in place by screws 27 which normally close the openings 25.

While the housing 11 may be suitably carried by the tread bar 6, it is shown as mounted upon an end of the latter, the undersurface of the housing being curved to fit the upper surface of said bar 6, and said housing being provided with projecting end flanges 28 bolted to said bar 6 as at 29. Suitable openings 30 are provided through the bottom of housing 11 to facilitate drainage of condensation from said housing as well as to permit circulation of air therethrough whereby the temperature within the housing may be kept as near as possible to the outside temperature for insuring proper action of the mercury tube switch 7.

Obviously, the spring pressed pins 22 normally hold the tread bar 6 in untilted position as shown in Figure 4, and as soon as the wheels of the vehicle roll onto the tread bar 6 at either side of the latter, said tread bar will be rocked or laterally tilted in a direction toward the side at which the vehicle approaches. Such tilting of the bar 6 causes corresponding movement of switch 7 so that the latter closes the normally open circuit of alarm or annunciator 5, thereby rendering the latter operative and informing the attendant of the service station of the arrival of the vehicle at the latter. As soon as the wheels of the vehicle pass entirely over the tread bar 6, it is automatically returned again to its normal untilted position by pins 22, thereby rendering the alarm or annunciator inoperative and resetting the device for the next actuation when another vehicle may arrive.

From the foregoing description, it is believed that the construction and operation, as well as the advantages of the present invention, will be readily understood and appreciated by those skilled in the art. Minor changes may be made in the specific construction illustrated and described, without departing from the spirit and scope of the invention as claimed.

What I claim as new is:

1. In a signaling device of the character described, an elongated tread bar having a central longitudinal rib on its underside for mounting said tread bar upon the ground for lateral tilting movement, yieldable means to normally position said bar in non-tilted position, and a switch operable by the bar when tilted for closing an alarm circuit and for opening the alarm circuit when the tread bar is returned to untilted position.

2. In a signaling device of the character described, an elongated tread bar having a central longitudinal rib on its underside for mounting said tread bar upon the ground for lateral tilting movement, yieldable means to normally position said bar in non-tilted position, and a switch operable by the bar when tilted for closing an alarm circuit and for opening the alarm circuit when the tread bar is returned to untilted position, a housing rigidly mounted on and tiltable with said tread bar, said switch being mounted in and movable with said housing together with the tread bar.

3. In a signaling device of the character described, an elongated tread bar having a central longitudinal rib on its underside for mounting said tread bar upon the ground for lateral tilting movement, yieldable means to normally position said bar in non-tilted position, a switch operable by the bar when tilted for closing an alarm circuit and for opening the alarm circuit when the tread bar is returned to untilted position, a housing rigidly mounted on and tiltable with said tread bar, said switch being mounted in and movable with said housing together with the tread bar, and means to adjust said switch relative to the tread bar and said housing whereby proper circuit opening and closing operation of said switch may be secured when the tread bar is positioned upon flat or inclined ground.

4. In a signaling device of the character described, an elongated tread bar having a central longitudinal rib on its underside for mounting said tread bar upon the ground for lateral tilting movement, yieldable means to normally position said bar in non-tilted position, and a switch operable by the bar when tilted for closing an alarm circuit and for opening the alarm circuit when the tread bar is returned to untilted position, a housing rigidly mounted on and tiltable with said tread bar, said switch being mounted in and movable with said housing together with the tread bar, said yieldable means comprising downwardly spring pressed pins carried by the housing at opposite sides of the tread bar and normally urged into engagement with the ground.

5. In a signaling device of the character described, an elongated tread bar having a central longitudinal rib on its underside for mounting said tread bar upon the ground for lateral tilting movement, yieldable means to normally position said bar in non-tilted position, and a switch operable by the bar when tilted for closing an alarm circuit and for opening the alarm circuit when the tread bar is returned to untilted position, a housing rigidly mounted on and tiltable with said tread bar, said switch being mounted in and movable with said housing together with the tread bar, arched straps anchored at their ends to the ground and passing across said tread bar to prevent upward displacement of the latter.

6. In a signaling device of the character described, an elongated tread bar having a central longitudinal rib on its underside for mounting said tread bar upon the ground for lateral tilting movement, yieldable means to normally position said bar in non-tilted position, a switch operable by the bar when tilted for closing an alarm circuit and for opening the alarm circuit when the tread bar is returned to untilted position, a housing rigidly mounted on and tiltable with said tread bar, said switch being mounted in and movable with said housing together with the tread bar, arched straps anchored at their ends to the ground and passing across said tread bar to prevent upward displacement of the latter, said tread bar having sockets in the upper surface thereof, and depending pins carried by said straps and loosely engaging in said sockets.

HARRIS T. COVINGTON, Jr.